United States Patent [19]

Piper

[11] Patent Number: 4,955,845
[45] Date of Patent: Sep. 11, 1990

[54] GAME CALLING DEVICE

[75] Inventor: Frank R. Piper, Delmont, Pa.

[73] Assignee: Penn's Woods Products, Inc., Delmont, Pa.

[21] Appl. No.: 137,951

[22] Filed: Dec. 24, 1987

[51] Int. Cl.⁵ .............................................. A63H 5/00
[52] U.S. Cl. ................................. 446/397; 428/542.4
[58] Field of Search .................. 446/397, 463; 2/247; 273/2, DIG. 26; 42/85; 428/542.4, 542.6, 163, 173; 43/2

[56] References Cited

U.S. PATENT DOCUMENTS

| | | | |
|---|---|---|---|
| 1,298,591 | 3/1919 | Smith | 273/DIG. 26 |
| 1,449,756 | 3/1923 | Jackson | 446/397 |
| 2,000,369 | 5/1935 | Zeiss | 273/157 R |
| 2,448,416 | 8/1948 | Carter | 2/247 |
| 2,573,856 | 11/1951 | Malone, Sr. | 43/2 X |
| 2,606,401 | 8/1952 | Boatwright | 446/397 |
| 2,643,483 | 6/1953 | Walker | 446/397 |
| 2,810,132 | 10/1957 | Nicholson | 2/247 |
| 3,129,527 | 4/1964 | Williams | 446/397 |
| 3,968,592 | 7/1976 | Piper | 46/178 |
| 4,003,159 | 1/1977 | Piper | 446/397 |
| 4,029,313 | 6/1977 | Angulo | 273/2 |
| 4,041,639 | 8/1977 | Funk | 446/397 |
| 4,116,084 | 9/1978 | Masuda | 446/463 |
| 4,483,097 | 11/1984 | Piper | 446/207 |
| 4,545,079 | 10/1985 | Bakken | 2/247 |
| 4,606,733 | 8/1986 | Willis | 446/397 |
| 4,836,822 | 6/1989 | Finley et al. | 446/397 |
| 4,846,753 | 7/1989 | Langston | 446/397 |

OTHER PUBLICATIONS

Penn's Woods Products–"Turkey Calls & Accessories" Catalog.

Primary Examiner—Robert A. Hafer
Assistant Examiner—Kevin G. Rooney
Attorney, Agent, or Firm—Dann, Dorfman, Herrell and Skillman

[57] ABSTRACT

A game calling device is provided which enables the distraction-free simulation of the sounds made by wild game using only one hand to operate. The device includes a support structure having a trough portion and a friction plate positioned within the trough; a call generator comprising the friction plate, a handle block and a striker positioned within the handle block for longitudinal displacement from a beginning position along the friction plate so as to generate a game call; and a spring linking the support structure with the handle block and the striker portion of the call generator to return the striker to a beginning position, thereby completing a cycle of alternating longitudinal movement. A flexible pouch is provided to enclose the device.

13 Claims, 1 Drawing Sheet

GAME CALLING DEVICE

FIELD OF THE INVENTION

The present invention relates to game calling devices of the type which simulate the sounds made by wild game. In particular, the invention relates to a device which requires only one hand to operate for the distraction-free calling of wild game.

BACKGROUND OF THE INVENTION

For the hunting of certain types of wild game, such as turkeys, for example, it is common practice to use a game calling device to lure the wild game into the vicinity of the hunter. Although different types of calling devices have been used, a common type of call is the friction call which takes the form of a housing or support structure having a friction plate and a striker which is scraped against the friction plate to generate a desired game call. Typically, the conventional friction type of game calling device commonly has a support structure assembly which is completely separate from the striker assembly. In order to use the calling device, the support structure must be held in one hand of the user while the striker is held in the other hand. To produce the desired game call, the striker is then scraped against the friction plate on the support structure.

Another conventional type of game calling device is known as the box call. This type of call includes a striker which is loosely hinged to a resonant box. During use of the box call, the resonant box is typically held in one hand and the striker is held in the other hand. To produce the desired call, the user moves the striker relative to the box so that a suitable surface of the striker is scraped along a side edge surface of the box. In order to enhance the operation of the box call, chalk is typically applied to the surfaces of the striker and the box which are scraped together.

While certain types of box calls may be operated with one hand, this is not always convenient or desirable. For one thing, the striker on a conventional box call extends a distance beyond the box to form the striker handle making one-handed operation somewhat cumbersome. As a result, even the types of box calls which permit one-handed operation are often operated with both hands for purpose of convenience.

Game calling devices, such as the conventional friction type calls and the conventional box calls, may not always be desired by the hunter. For example, upon luring the wild game into his vicinity, a hunter using a call requiring two hands to operate will first have to drop the game calling device to permit the hunter to reach for his gun in order to attempt a shot at the wild game. Such movements often increase the risk of frightening off the wild game.

Another potential drawback associated with conventional game calling devices is that such devices often require a fair amount of movement to operate. When hunting wild game, such as turkeys, which have relatively keen vision, a minimal amount of movement in the operation of the game calling device is critical to avoid frightening away the wild game.

Another conventional game calling device, known as a diaphragm-type calling device, includes a suitable frame having a diaphragm which is vibrated by a flow of air to generate the desired call. The conventional diaphragm-type game calling device is of a suitable size and shape to be inserted into the mouth of the user where it is supported against the roof of the user's mouth. The device typically includes a diaphragm supported by a frame so that the diaphragm presents an exposed edge portion which vibrates as the user exhales air across the diaphragm. This type of calling device requires air to be blown across the diaphragm for an extended period of time until the turkey or other wild game is lured into the vicinity of the hunter. After a while, this may prove to be exhausting to the user. Another potential drawback is that various hunters may object to a device which must be inserted into the user's mouth. For example, in extremely cold weather, a hunter may not wish to expose his fingers to remove and insert the device.

Yet another type of calling device which has been used is the reed type of call. The reed type of call is a hand-held device which includes a diaphragm assembly that is mounted by a support housing at an end portion of an elongated, generally tubular bellows. As the user shakes the bellows, the diaphragm assembly is vibrated in opposite directions by rapid bursts of air from the bellows. A cone-shaped megaphone communicates with the diaphragm assembly to form a sound amplifier for the call being generated. While this type of calling device may be used with only one hand, a great deal of hand movement is often required to produce the desired call. Unfortunately, excessive hand movement may frighten off the wild game.

SUMMARY OF THE INVENTION

In an attempt to overcome the drawbacks associated with the conventional calls, the game calling device of the present invention has been designed to provide a game calling device which is simple to operate with one-hand and extremely limited movement. The game calling device includes a support structure linked by a spring to a striker whereby, after movement of the striker from a beginning position along the support structure so as to generate a game call, the spring returns the striker back to the beginning position. More specifically, the game calling device includes a support structure having a trough and a friction plate positioned within the trough on the support structure. A call generator assembly is provided which includes the friction plate, a handle block and a striker protruding from the handle block for longitudinal displacement from a beginning position along the friction plate portion of the trough so that the striker frictionally engages and scrapes against the friction plate to generate the desired call. Resilient means in the form of a spring links the support structure with the handle block and striker portion of the call generator assembly to return the striker to the beginning position, thereby completing a cycle of alternating longitudinal movement. Upon longitudinal displacement of the striker along the friction plate, the sounds made by wild game are simulated.

When the game calling device is operated, only a minimal amount of hand movement is required and only little effort on the part of the hunter is needed to operate the game calling device for extended periods of time. The game calling device, in accordance with the present invention, is particularly suited for one-hand operation, thereby leaving the hunter's other hand free for supporting or aiming his gun in convenient position for shooting at wild game. The game calling device has a configuration which advantageously permits one-handed use with only a minimal amount of hand movement to avoid frightening away the wild game during operation. The game calling device is also configured to enable the hunter to tabulate, using trophy tokens, each successful hunt using the game calling device. In addition, a pouch of flexible fabric is provided for completely enclosing the device during use. The pouch is dimensioned to cooperate with the support structure to maintain the striker in engagement with the friction plate.

BRIEF DESCRIPTION OF THE DRAWINGS

The foregoing summary, as well as the following detailed description of a preferred embodiment of the present invention, will be better understood when read in conjunction with the appended drawings, in which.

DESCRIPTION OF THE PREFERRED EMBODIMENT

Figure 1:
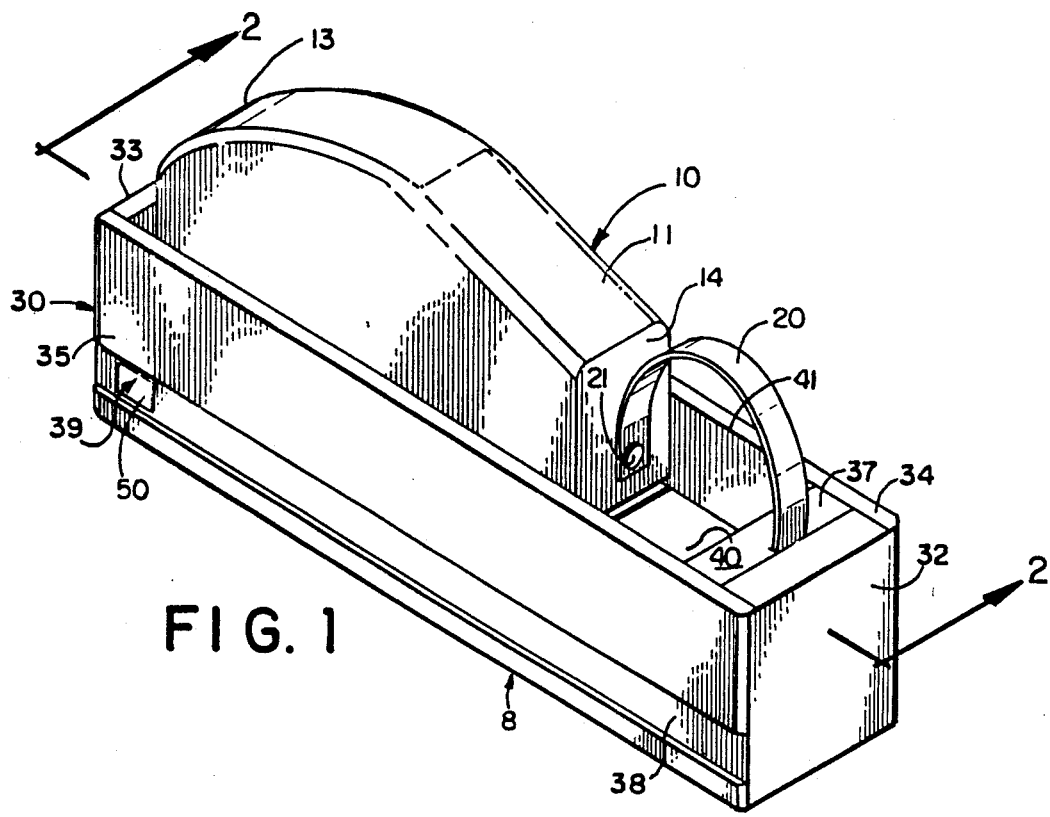
FIG. 1 is a perspective view of a game calling device embodying the present invention showing a support structure, a handle block and a spring.

Referring generally to the drawings, there is shown generally a game calling device 8 including a support structure 30 having guide means in the form of a trough 40. To produce desired game calls, the game calling device 8 comprises a call generator assembly, generally designated 10, including a friction plate 31 positioned within the trough 40 on a support structure 30, a handle block 11 for activating the game calling device, and a striker 12 supported within the handle block 11 for longitudinal displacement from a beginning position along the trough 40 so as to frictionally engage and scrape against the friction plate 31 to generate the sounds of wild game. A leaf spring 20 links the support structure 30 to the handle block 11 and striker 12 of the call generator assembly 10 to return the striker 12 back to its beginning position after manual displacement of the handle block 11. Upon longitudinal displacement of the striker 12 along the friction plate 31, the sounds made by wild game are simulated.

Figure 2:
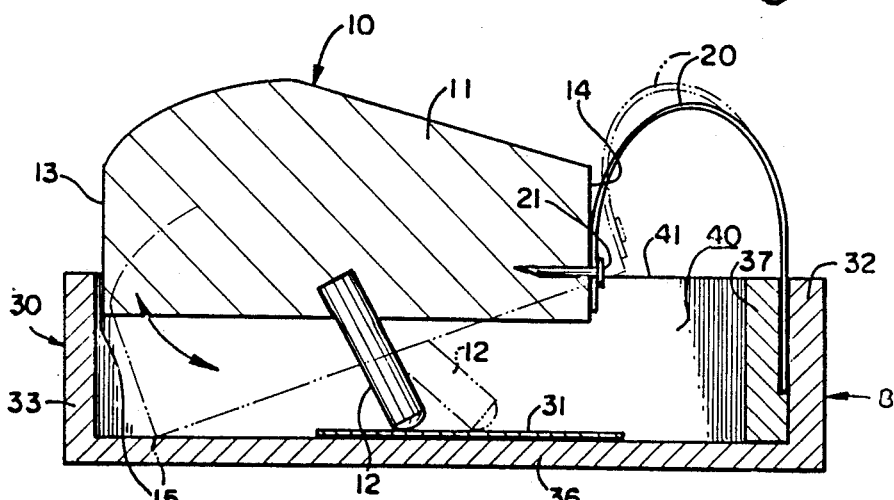
FIG. 2 is a sectional view taken on the line 2—2 of FIG. 1 showing the operative positions of the handle block as a wand portion of the striker scrapes against a friction plate.

Referring now to FIGS. 1 and 2, the support structure 30 includes a generally flat bottom wall 36 having generally parallel, spaced apart end walls 32 and 33, and generally parallel, opposing sidewalls 34 and 35 mounted generally perpendicular to the bottom wall 36 to form a generally rectangular trough portion 40 open at a top portion 41 of the support structure opposite bottom wall 36. The exterior surface of bottom wall 36 of support structure 30 may rest upon a horizontal surface or may be held in a user's hand. The support structure 30 further includes an external groove portion 38 which provides a groove of suitable size to receive trophy tokens 39, formed of aluminum or the like, for the tabulation of each successful hunt using the game calling device. As shown in FIG. 1, the groove portion 38 extends the length of an exterior surface of sidewall 35 generally perpendicular to end walls 32 and 33. The trophy tokens 39 are fastened to groove portion 38 with a suitable fastener such as an adhesive strip which serves to affix the trophy tokens 39 in position in the groove portion 38 to prevent removal. An exposed face 50 of the trophy token may be etched with a suitable design to enhance the appearance of the token. The trophy tokens are preferably dimensioned to be mounted within the groove portion 38 so that the exposed face 50 of the token is positioned with a slight recess into the groove portion 38 relative to the outer surface of sidewall 35. The recessed mounting of the tokens 39 into the groove portion 38 prevents the tokens 39 from inadvertantly being knocked off the calling device during use.

In addition, the support structure 30 includes a support wall 37 to firmly sandwich one end of leaf spring 20 between the support wall 37 and the adjoining end wall 32. The support wall 37 is fastened to side wall 32 using an adhesive or other suitable fastener. While the end of spring 20 is held firmly by the compressive forces created as support wall 37 is fastened to side wall 32, it may be desirable to permit the end of the spring 20 to be removeable from the sandwich by a pulling action. The support structure 30 also contains the friction plate 31 of call generator 10 within the trough portion 40 for cooperation with the striker 12 to generate a game call. The friction plate 31 is preferably made of aluminum and is affixed to the bottom wall 36 of support structure 30 using glue, cement or other suitable adhesives or fasteners so that the friction plate 31 remains securely in place upon contact with striker 12. Alternatively, the friction plate 31 may be formed as an integral portion of the bottom wall 36 so that a generally planar surface of the bottom wall functions as the friction plate.

Referring now to FIG. 2, the call generator 10 includes a handle block 11 having a striker 12, preferably formed of an acrylic composition affixed to handle block 11. The striker is in the form of an elongated rod and is mounted in the handle block so that an elongated wand portion of the striker protrudes from the handle block 11 at a desired angle relative to the generally planar friction plate 31 so that the desired game call is produced as the tip of the striker 12 scrapes against the friction plate 31. The end of spring 20, opposite the end sandwiched between the support wall 37 and the end wall 32, is affixed to handle block 11 using a suitable fastener 21 to thereby link the handle block and striker portion of call generator assembly 10 to the support structure 30. The spring thereby suspends said handle and striker from the support structure to afford alternating longitudinal displacement of the handle and striker within the trough.

The handle block 11 has a curved portion to fit in the palm of the operator's hand for easy grasping and operation. The handle 11 has an outbound end 13 positioned adjacent to the end wall 33 and an inbound end 14 positioned adjacent to end wall 32. In the beginning position of the handle, the outbound end 13 of the handle 11 is urged against an inner surface of end wall 33 by the force of spring 20. The end wall 33 serves as a stop for the handle 11. In this regard, when the spring 11 returns the handle back to its beginning position after manual displacement to generate a call, end wall 33 stops the return movement of the handle 11 at the beginning position with the outbound end 13 of the handle 11 abutting the inner surface of end wall 33.

As shown in FIG. 2, when the outbound end 13 of the handle block 11 is forced downward and toward end wall 32 by the palm or fingers of the user to actuate the device, a slight rocking motion is created and the inbound end 14 simultaneously rocks upwardly, thereby causing the striker to move longitudinally from a beginning position on a path along the friction plate portion of trough 40. The striker continues to move longitudinally from the beginning position until the desired call is produced. In an extreme position, the handle 11 may be moved from its beginning position until lower edge 15 of handle block 11 contacts the bottom wall 36 of the trough 40; the handle block being in an extreme rotated position where it may not be rotated further in the counterclockwise direction as shown in FIG. 2. Such, the trough 40 permits the user to controllably force the handle by actuation toward the friction plate. Upon release of the outbound end of the handle block after initial displacement, the spring biases the handle block and striker portion of the call generator to rock in a clockwise direction as shown in FIG. 2 whereby the outbound end moves upward and the inbound end moves downward, thereby causing the striker to move in the reverse direction longitudinally along the path back to the beginning position. Upon returning to the beginning position, the handle block and striker portion of the call generator 10 thereby completes one full cycle of alternating longitudinal displacement of the striker along the friction plate.

Figure 3:
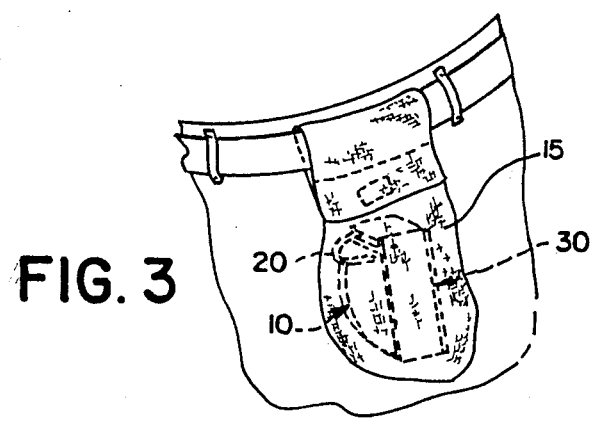
FIG. 3 is a perspective view showing the game calling device in dashed lines stored in a pouch which is attached to the belt of a hunter.

As shown in FIGS. 1-3, the handle block and striker assembly of call generator 10 is suspended by leaf spring 20 to afford longitudinal displacement of the striker 12 along friction plate 31 so as to generate a game call. The handle block 11 and striker are disposed within a guide formed by the trough 40 so that the trough guides the handle block 11 and striker through a path of alternating longitudinal displacement. When the handle of the call generator 11 is displaced to actuate the calling device, the striker 12 scrapes along friction plate 31 which is mounted in the path of movement on the bottom wall 36 of the trough 40 so that the sound caused by the friction between the striker and the friction plate resonates through the trough 40 so as to simulate the sounds made by wild game. The trough 40 affords free pivotal movement of the handle block 11 about an axis; such that rocking motion of the handle block 11 affords longitudinal movement of striker 12 from a beginning position along friction plate 31 so as to generate a game call. Sidewalls 34 and 35 contain the movement of the handle 11 within the trough 40 to prevent lateral movement of the handle 11 within the trough. After the operative displacement of striker 12 from a beginning position along friction plate 31 so as to generate a game call, the spring 20 returns the striker and handle block portion of the call generator back to the beginning position, thereby completing a cycle of alternating longitudinal displacement of striker 12 along friction plate 31. The elongated wand portion of striker 12 projecting from handle block 11 must engage the friction plate 31 at a predetermined angle of orientation to generate sufficient friction to simulate the sounds made by wild game. In addition, the friction plate should be free of debris and moisture upon contact with the wand portion to produce an audible call. The wand portion of striker 12 may be comprised of an acrylic composition, a glass composition, or wood and friction plate 31 may be comprised substantially of aluminum, slate, or wood to effectively simulate the sounds made by wild game. If the friction plate 31 is constructed of wood, the inner planar surface of the bottom wall 36 may serve as the friction plate so that the friction plate is an integral part of the bottom wall 36 of the support structure. To facilitate construction of the game calling device when a separate friction plate 31 is employed, the friction plate may be dimensioned to span the entire exposed inner surface of the bottom wall 36.

Referring now to FIG. 3, for the effective use of the game calling device, it may be placed in a camouflaged pouch 15 attached to a hunter's belt and operated by one hand using a squeeze-release activated force to the outbound end of the handle block 11 to subtley and with a minimal amount of movement simulate the sounds made by wild game. The pouch 15 is preferably made of a canvas fabric which is sufficiently flexible to enable the device to be operated while it is in the pouch. The pouch is small enough so that it cooperates with the support 30 to maintain the handle block 11 engaged within the trough 40 so that the striker remains in engagement with the friction plate, but is sufficiently large to permit the handle block 11 to be displaced from its beginning position to generate its call. While in its pouch, the device may be operated while in any orientation since the pouch maintains the striker 12 in operative engagement with the friction plate 31.

Some of the many advantages and novel features of the invention should now be apparent in view of the foregoing description and accompanying drawings. For example, a game calling device has been described which consists of a striker, a support structure and a spring linking the support structure to the striker such that when the striker is actuated by the application of pressure to the outbound end of the handle block portion of the call generator using one hand, a wand portion of the striker extending below the handle block scrapes along a friction plate which is attached to the bottom interior wall of the trough portion of the support structure, thereby imitating a sound similar to a call made by wild game. Then, upon releasing the handle block portion of the call generator from the hunter's grip, spring 20 biases the striker 12 in the opposite direction returning striker 12 to a beginning position. The wood construction of the support structure as well as the use of plastic and metal or slate in the construction of the game calling device yields low cost to the consumer and durability to the assembly.

It will be recognized by those skilled in the art that changes or modifications may be made to the above-described embodiment without departure from the broad inventive concepts of the invention. For example, aside from orienting the striker for movement within the support structure and being attached for displacement using one spring, the striker may also be mounted such that it is positioned between springs fastened at opposite ends of the trough for biasing movement along the friction plate within the support structure. In addition, a coil spring may be used to replace the leaf spring. Furthermore, the trough portion of the game calling device may be constructed of any of an assortment of materials provided that the resonant properties of the material are sufficient to simulate the sounds made by wild game. It is understood, therefore, that the invention is not limited to the particular embodiment which is disclosed, but is intended to include all modifications and changes which are within the scope and spirit of the invention as defined by the appended claims.

What is claimed is:
1. A game calling device comprising:
    (a) a support having end walls, generally opposing parallel sidewalls and a generally flat bottom wall to provide trough means;
    (b) a generally flat friction plate on the bottom wall;

(c) a manually actuatable handle positioned in the trough means for actuating the game calling device to generate a desired game call, the trough means permitting the handle to be controllably and manually moved during actuation toward the friction plate and along a path of movement on the support between the end walls, said trough means guiding longitudinal movement of the handle along said path from a beginning position abutting one end wall toward the other end wall, the sidewalls containing lateral movement of the handle;

(d) a striker having an elongated wand portion protruding from the handle at a selected angle relative to the friction plate, the wand portion protruding from the handle toward the friction plate on the bottom wall in position to frictionally engage the friction plate along the path of movement upon operative displacement of the handle from the beginning position; and (e) a spring connected with the support and the handle for suspending said handle within the trough to return the handle back to the beginning position after operative displacement of the handle, said handle being supported relative to the support solely by said spring to enable movement of the handle toward the friction plate and along the path of movement between the end walls.

2. The device set forth in claim 1 wherein said handle is moveable relative to the striker plate by actuation to change the angle of orientation of the elongated wand portion relative to the friction plate.

3. The game calling device set forth in claim 1 wherein said spring comprises a leaf spring.

4. The game calling device set forth in claim 1 wherein said wand portion comprises an acrylic composition.

5. The game calling device set forth in claim 1 wherein said wand portion comprises wood.

6. The game calling device set forth in claim 1 wherein said wand portion comprises a glass composition.

7. The game calling device set forth in claim 1 wherein said friction plate comprises aluminum.

8. The game calling device set forth in claim 1 wherein said friction plate comprises slate.

9. The game calling device set forth in claim 1 wherein said friction plate comprises wood.

10. The game calling device set forth in claim 1 comprising trophy token means to tabulate each successful hunt using said game calling device, and wherein said support includes groove means for receiving said trophy token means and said game calling device includes fastening means for affixing said trophy token means in said groove means to prevent removal.

11. The game calling device set forth in claim 10 wherein said token means is dimensional so that said token means is recessed into the groove means.

12. The game calling device set forth in claim 1 including a pouch of flexible fabric separate from a user's clothing for completely enclosing said support, said friction plate, said handle, said striker and said spring during use externally of the user's clothing.

13. The game calling device set forth in claim 12 wherein said pouch is dimensioned to cooperate with the support and the handle to maintain said striker in engagement with said friction plate.

* * * * *